united States Patent [19]

Burzynski

[11] 4,223,121
[45] Sep. 16, 1980

[54] ORGANOPOLYSILOXANE RESINS OF INCREASED HARDNESS

[75] Inventor: Alfred J. Burzynski, Toledo, Ohio

[73] Assignee: Owens-Illinois, Inc., Toledo, Ohio

[21] Appl. No.: 966,421

[22] Filed: Dec. 4, 1978

[51] Int. Cl.² .............................................. C08G 77/06
[52] U.S. Cl. ................................... 528/12; 260/29.2 M; 260/33.4 SB; 427/387; 428/412; 428/447
[58] Field of Search .................... 528/12; 260/29.2 M, 260/33.4 SB; 427/387; 428/412, 447

[56] References Cited

U.S. PATENT DOCUMENTS

| | | | |
|---|---|---|---|
| 3,457,221 | 7/1969 | Stengle, Jr. | 528/12 |
| 3,460,980 | 8/1969 | Burzynski | 528/12 |
| 3,474,070 | 10/1969 | Levene | 260/33.6 SB |
| 3,491,054 | 1/1970 | Thomas | 260/33.4 SB |
| 4,006,271 | 2/1977 | French et al. | 528/12 |

OTHER PUBLICATIONS

Morrison et al., Organic Chemistry, p. 454, Allyn and Bacon, Inc., Boston (1959).

Primary Examiner—Melvyn I. Marquis
Attorney, Agent, or Firm—David R. Birchall; Myron E. Click; David H. Wilson

[57] ABSTRACT

A process for forming organopolysiloxanes from trialkoxysilanes and the resulting resinous products are disclosed, characterized in that the organopolysiloxane resins have increased hardness when hydrolysis and condensation of the trialkoxysilanes are carried out in aqueous solution acidified by formic acid and at a relatively high strength previously regarded as inoperative. The formic acid, for example, may be present in an amount greater than 700 ppm. After hydrolysis of the trialkoxysilane, the resulting silonetriol is condensed to form the organopolysiloxane.

12 Claims, No Drawings

ORGANOPOLYSILOXANE RESINS OF INCREASED HARDNESS

BACKGROUND OF THE INVENTION

Hydrolysis-condensation products of trialkoxysilanes, such as of methyltrialkoxysilanes, are of commercial interest, because such products possess several properties unique among organopolysiloxanes. Since, for example, such products have no carbon-to-carbon bonds, they transmit well ultraviolet radiation, and of all organopolysiloxanes they contain a relatively high proportion of inorganic constituents.

However, it is extremely difficult to control the hydrolysis and condensation rates of organotrialkoxysilanes. Most silanols, that is, silicon compounds which possess one or more hydroxyl groups bonded directly to a silicon atom, tend to form the corresponding ether analogs (siloxanes) by an equilibrium reaction that may be regarded as the loss of one molecule of water per two such hydroxyl groups. The reactivity of silanols, especially silanetriols, to form siloxanes is so great that selectivity in product formation is seldom possible, and complexity of the reaction mixture often precludes identification of specific products.

The high activity of most silanols makes it desirable to form them in situ. This is usually accomplished by hydrolysis of precursors which contain silicon atoms attached to substituents convertible to hydroxyl groups. These hydrolysis reactions may be illustrated as

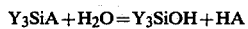

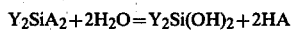

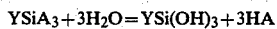

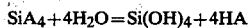

in which Y represents, for example, an organic group such as hydrocarbon radical, and A represents a hydrolyzable group such as alkoxy, acyloxy, halogen, etc.

It is known that an acid medium catalyzes hydrolysis and siloxane formation in the types of reactions just described. It was previously thought that control of the reaction conditions and particularly of the acid pH condition was an absolute necessity to prevent an uncontrollable reaction, such as premature gelation. The acute sensitivity of silanetriols, such as methyl silanetriol, to acid catalysis in general precluded the use, as precursors, of methyltrichlorosilane, methyltriacetoxysilane, and similar derivitaves which liberate acid byproducts during hydrolysis. As a result attention has been directed mainly to trialkoxysilanes such as methyltrialkoxysilane.

Accordingly, prior research relating to the hydrolysis-condensation of trialkoxysilanes to organopolysiloxanes has concentrated on control of an acid pH. To avoid gelation and effect hydrolysis and polysiloxane formation at a conveniently rapid and controllable rate, it was regarded as essential to maintain the acidity of the hydrolysis-condensation reaction within certain limits. The amount of acid catalyst, such as hydrochloric acid, used was previously fairly carefully regulated. A slight deviation from a prescribed amount, such as from inadvertent mistake, could cause large variations in the polymer produced. The reactions of hydrolysis and condensation are normally so fast and sensitive that they could not be easily controlled.

U.S. Pat. No. 3,389,114 to Burzynski and Martin discloses using a reaction mixture of a methyltrialkoxysilane and from 0 to about 700 parts of acid, as an upper limit, expressed as HCl, per million parts of total silane reactant material and water. This disclosure is limited to methyltrialkoxysilanes in which the alkyl group has less than four carbon atoms, since the system is regarded as even more sensitive to other alkyltrialkoxysilanes.

U.S. Pat. No. 3,428,599 to Newing teaches prevention of premature gelation of organopolysiloxanes by controlling the acidity of the polymers during a precuring step with a silazane such as hexamethyldisilazane.

U.S. Pat. No. 3,474,070 to Levene discloses a process for hydrolyzing organotrialkoxysilanes at neutral conditions using an ion-containing hydrolysis catalyst, such as a ferric alkoxide or a ferric chelate.

U.S. Pat. No. 3,479,316 to Levine describes a process for hydrolyzing trialkoxysilanes at neutral conditions using a vanadium-containing hydrolysis catalyst such as trialkylvanadate.

SUMMARY OF THE INVENTION

A principal object of the present invention is to provide a process for preparing organopolysiloxanes from trialkoxysilanes and the resulting products, in which such products have increased hardness and solvent resistance, such as acetone resistance, as compared with other organopolysiloxanes formed by hydrolyzing and condensing trialkoxysilanes. A related object is to provide coating compositions of organopolysiloxanes of increased hardness for coating various substrates including those of resinous plastic bodies. A further object is to provide hydrolysis-condensation of trialkoxysilanes in highly acidic aqueous solutions which results in organopolysiloxanes of increased hardness.

In one form, the process comprises hydrolyzing a trialkoxysilane in aqueous solution containing (a) at least the stoichiometric amount of water required for complete hydrolysis of the trialkoxysilane, and (b) formic acid at a strength greater than 700 parts per million ppm. After hydrolysis, the hydrolyzed silane is condensed as by heating to form the organopolysiloxane. In general, each of the trialkoxy substituents of the silane may contain one carbon atom to about six carbon atoms, while the remaining substituent may be alkyl of 1 to about 6 carbon atoms or phenyl.

The amount of water present in the reaction mixture can affect physical properties of the resulting organopolysiloxanes. As a rule, the molar ratio of the water and trialkoxysilane is within the range of about 1.5:1 to about 10:1, respectively. The hydrolyzed silane can be condensed to an organopolysiloxane by heating the reaction mixture, such as at a temperature within the range of about 40° C. to about 300° C. for about one hour to about 10 hours. Unexpectedly, the formic acid in the aqueous reaction mixture can be at relatively high concentrations, for example, greater than 700 ppm to as much as 80,000 ppm and even higher.

The organopolysiloxane products of the invention can, if desired, be molded as solid, integral castings. However, due to their increased hardness and solvent resistance, the organopolysiloxanes find useful application as coatings for substrates, particularly substrates of other resinous plastic bodies. The hydrolyzed silanes can be directly condensed to the organopolysiloxanes desired, or the hydrolyzed silanes can be partially condensed and concentrated to a precure organopolysiloxane which is capable of further cure. Such an organopolysiloxane is applied to a point of use and then finally cured to a thermoset, preferably cross-linked condition.

DESCRIPTION OF THE PREFERRED EMBODIMENTS

In general, the present organopolysiloxanes are prepared by hydrolysis of a trialkoxysilane in an aqueous solution which contains at least the stoichiometric amount of water required for complete hydrolysis of the silane. It has been discovered that much higher acid concentrations can be used in the initial hydrolysis reaction than heretofore thought possible as long as the acid that is used is formic. The higher acid concentrations, in turn, lead to harder organopolysiloxanes following cure. Therefore, in accordance with the present invention, the trialkoxysilane reaction mixture contains formic acid in relatively large concentrations previously regarded as inoperative, for example, greater than 700 ppm. Following hydrolysis, the hydrolyzed silane is condensed to form the organopolysiloxane. Because of their increased hardness, the organopolysiloxanes make polysiloxane excellent coating compositions.

The various components of the reaction mixture are discussed together with preferred process steps in the hydrolysis and condensation of the trialkoxysilanes. Examples describe a preferred use of the resulting organopolysiloxanes as coatings and the increased hardness inherent in organopolysiloxanes prepared as herein described and claimed.

Trialkoxysilanes useful in the present invention include but are not restricted to those corresponding to the formula:

$$RSi(OR_1)_3 \qquad (1)$$

in which preferably R is alkyl from 1 to about 6 carbon atoms and phenyl, and $R_1$ is alkyl from 1 to about 6 carbon atoms.

When R and $R_1$ are alkyl, they may be the same or different and include methyl, ethyl, propyl, isopropyl, butyl, isobutyl, pentyl, isopentyl, hexyl, isohexyl, and the like. Specific examples include methyltrimethoxysilane, methyltriethoxysilane, methyltri-n-propoxysilane, methyltriisopropoxysilane, (1, 1-dimethylethyl) tripropoxysilane, methyltributoxysilane, hexyltriethoxysilane, phenyltrimethoxysilane, phenyltriethoxysilane, and the like. It is understood that mixtures of the defined trialkoxysilanes can be used.

The use of formic acid is essential to the invention. If one employs even the next higher homolog, namely, acetic acid, the results are similar to that using other acids, such as hydrochloric acid, and only the lower acid concentrations are operable. It further appears that the use of the higher concentrations of formic acid expands the types of trialkoxysilanes that can be used. The non-alkoxy substituent can be alkyl containing as many as six carbon atoms and include as well phenyl. The alkoxy substituent, likewise, can be increased from the maximum of three carbon atoms formerly thought operable to as many as six carbon atoms.

Using methyltrialkoxysilane as an example, hydrolysis of a trialkoxysilane can be represented as:

$$CH_3Si(OR_1)_3 + 3H_2O = CH_3Si(OH)_3 + 3R_1OH \qquad (2)$$

$$nCH_3Si(OH)_3 = (CH_3SiO_{1.5})_n + 1.5nH_2O \qquad (3)$$

or overall $$nCH_3Si(OR_1)_3 + 1.5nH_2O = (CH_3SiO_{1.5})_n + 3nR_1OH \qquad (4)$$

in which $R_1$ is as previously defined in Formula 1, and n represents a number corresponding to the degree of polymerization and is greater than one.

The concentration of water in the reaction mixture for the initial hydrolysis reaction should be at least the stoichiometric amount required for complete hydrolysis of the silane. As indicated by Equation 4, the minimum amount is 1.5 mole of water per mole of silane. Organopolysiloxane resins can be prepared at this water concentration. But a smaller water content in the reaction mixture leads to polymers that are rubbery and soft, presumably due to incomplete hydrolysis which leaves residual alkoxy groups in the partial condensation product. The molar ratio of water to silane can be as high as 10. However, if the water to silane molar ratio is in the range of about 1.5 to about 5, the alkanol by-product formed during hydrolysis acts as a solvent for the other products and reactants, and the initially heterogenous reaction mixture becomes clear and homogenous. This homogeneity allows more uniform control of resin formation.

If the water to silane molar ratio is within the range of 5:1 to 10:1, useful polysiloxanes are still obtained, but the alkanol formed is insufficient to convert the aqueous medium to a solvent for the reactants and products. In this case it is possible that resin precipitation can occur. However, insolubility of resinous products at such higher water concentrations can be overcome by adding a water-miscible organic solvent such as ethanol, propanol, etc. At water concentrations above about 10 moles of water per mole of silane, gel formation can occur even if sufficient organic solvent is added to make the reaction mixture homogeneous.

The exact upper limit of the water to silane molar ratio depends upon such factors as the exact silanes used, time and temperature, and the like. Accordingly, it is not possible to set forth precisely the upper limit, but it can be determined by simple trial and error tests in each case. The molar ratios within which no addition of organic solvent is required, such as from about 1.5 to about 5 moles of water per mole of silane are preferred.

While it was previously considered essential to maintain the acidity of the initial hydrolysis-condensation reaction mixture within certain limits to avoid gelation and effect polysiloxane formation at a conveniently rapid rate, it has now been discovered that acid pH hydrolysis and condensation of a trialkoxysilane can be effected at considerably higher acid concentrations than thought possible as long as the acid that is used is formic. Concentrations higher than 700 ppm are useful up to concentrations in excess of 80,000 ppm. Concentrations of formic acid and of 300,000 ppm have been successfully used. However, a desirable range of formic acid concentration is about 750 ppm to about 80,000 ppm. The shelf life of organopolysiloxanes formed from formic acid concentrations above 80,000 ppm begins to decline. A preferred acid concentration range is about 2,400 ppm to about 4,800 ppm.

The value of the formic acid concentration in parts per million can be determined as follows. To 25 ml. of toluene, 13 drops of a 0.04% methanol solution of bromcresol purple were added and the resultant mixture then titrated to a blue-violet endpoint with 0.02 N potassium hydroxide. A 10.0 ml. sample of methyltrialkoxysilane was pipetted into the solution so obtained and the mixture titrated to the same blue-violet endpoint with 0.02 N potassium hydroxide. The weight of a 10 ml. sample was independently determined. Under these conditions, acidity is calculated as $$A = 729 V/S$$

where A is acid content in parts by weight (grams) of formic acid per million parts by weight (grams) of methyltrialkoxysilane (assuming that the entire sample is the silane), V is the volume of alkali used in the second titration described, and S is the weight of the sample in grams.

The initial hydrolysis-condensation reaction may be carried out by placing in a suitable vessel pure water, the trialkoxysilane, and formic acid in an amount greater than 700 ppm. The resulting mixture is then heated under reflux. The initially cloudy reaction mixture clears on heating, usually within an hour, because the alcohol formed as a hydrolysis by-product dissolves the other components of the mixture. A suitable degree of hydrolysis-condensation is usually obtained if reflux is allowed to proceed for about one hour to about four hours after the mixture has cleared. This step can be carried out at temperatures lower than reflux, but the rate is slower.

Following hydrolysis of the silane to form a silanetriol, the latter is converted to an organopolysiloxane. This can be accomplished in general by heating the reaction mixture represented by the aqueous solution at a temperature from about 40° C. to about 300° C. for about one hour to about 10 hours, and preferably from about 70° C. to about 150° C. for about two to four hours. However, in practice, it is preferred to obtain the organopolysiloxane by a procedure within the stated temperature and time ranges which embodies concentrating the aqueous solution with attendant removal of by-products.

For example, after hydrolyzing the silane, the aqueous solution may be heated gradually to a final temperature of about 65° C. to about 300° C. and preferably from about 70° C. to about 150° C., while gradually removing by volatilization alkanol by-products and some water. As an instance, the volatilization and removal of aklanol by-products and water may take place with continuing condensation and heating within the range of about 70° C. to about 300° C., and preferably from about 90° C. to about 220° C., for a time short of solid or gel formation in the indicated temperature ranges.

The reaction mixture from the initial hydrolysis-condensation is concentrated by removing volatile components by distillation as from the vessel containing it. All of the solvents, such as water and by-product alkanol, should not be removed, or the resin will have a tendency to gel. Usually removal of about 80 mole percent of the alkanol by-product provides a residue convenient to manipulate further as herein described. The concentrate so obtained is further heated as herein described, conveniently while stirring in an open vessel. The elimination of water and other volatile materials from the reaction mixture at this point presumably leads to further polymerization, and the mixture becomes increasingly viscous.

At pressures near one atmosphere, temperatures within the range of about 40° C. to the reflux temperature of the mixture are useful. Temperatures much below this range require substantially longer times for reaction, but they are operable. For example, temperatures as low as 20° C. may be used when the time of reaction may be as much as ten hours or more. In general, temperatures at or near the reflux temperature of the reaction mixture are preferred.

As evidenced by Equations 2 and 4, some alkanol by-product is retained in the reaction mixture during initial hydrolysis and condensation. This control of the rate of resin formation prevents premature gelling and allows the preparation of highly cross-linked polymers with good dimensional stability. If the by-product alkanol concentration is allowed to fall substantially below 1.5 moles of alkanol per mole of silane monomer (assuming complete hydrolysis of the silane), gel formation occurs. This limit can vary slightly with the particular conditions and materials used.

As indicated, the described heating of the reaction mixture to a temperature above its initial reaction temperature to a maximum temperature, such as within the range of about 65° C. to about 300° C., removes some but not all volatile material including the alkanol by-product and water. This procedure can be interrupted to obtain a liquid residue, or it can be carried to completion to form a hardened, thermoset organopolysiloxane. When the condensation is interrupted short of complete cure while still leaving a liquid resin or liquid organopolysiloxane, the heating step is of the nature of a precure heating step. The purpose of precure is to effect controlled removal of the remaining volatiles while siloxane condensation continues at a convenient rate but slowly enough to avoid gel formation. As used here and in the claims, terms like "liquid siloxane partial condensation product," "liquid organopolysiloxane," "liquid resin," and the like are intended to include compositions obtained during a precure step which are still in a liquid or solution state. For example, the precure resinous products may be in solution in a mixture of water and a by-product alkanol, with or without other added solvent, or the precure resinous products may be dissolved in a single organic solvent or a mixture of organic solvents which may be miscible or immiscible with water.

Precuring can be carried out such that the product is a liquid, organic solvent-soluble, organopolysiloxane suitable for use as, for instance, a casting resin, or as a coating, potting, adhesive or similar composition, or as a component of such compositions. Alternatively, precuring of the liuqid siloxane partial condensation product can be continued to a point where, upon cooling, a solid, heat-softenable, solvent soluble siloxane partial condensation product is obtained which can be converted upon further curing, as by heating, from a thermosetting organopolysiloxane resin to one that is substantially fully cured over thermoset. For instance, such a soild, thermosetting, organopolysiloxane resin can be obtained as an intermediate product during the low-temperature curing of a concentrated liquid soloxane partial condensation product that has been cast into a mold.

In use, therefore, hydrolysis and condensation of the trialkoxysilane can take place as one continuous operation as when the aqueous reaction mixture of the silane is applied to a point of use, and the condensation reaction continued until a thermoset, resinous organopolysiloxane is obtained. Or, the condensation reaction can be interrupted to form any of the precure reaction products which, themselves, are later applied to a point of use and condensation continued until a desired end product is obtained. The finally cured products are substantially solid and possess a high degree of cross-linking.

Although the present organopolysiloxanes may be molded as castings, they are preferably employed as coatings for substrates where scratch and mar resistance are especially desirable. Any suitable substrate can be used including metals such as metal sheets or electroconducting wire, but substrates of reninous plastic bodies are especially useful. Good results, for example, are obtained with coating polycarbonates which normally scratch quite easily. The organopolysiloxanes may also be applied to optical glass, including window glass, and enable the coated glass to be washed and cleaned without abrading the glass itself. When used as a coating, a reaction mixture may be applied by spraying, dipping, flow coating, roller coating, and the like. The thickness of the coating can be controlled by varying the concentration of the resin solution and/or the number of coatings applied.

It is understood that various additives can be incorporated into the present resinous products such as those which are substantially chemically inert under the reaction conditions. These include filler materials like silica, alumina, and clays, coloring agents like alcohol or water-soluble dyes or insoluble pigments, etc. The colored products are useful as light filters.

The following examples only illustrate the invention and should not be construed as imposing limitations on the claims. Examples 1 and 2 illustrate properties of organopolysiloxanes obtained from trialkoxysilanes when the acid used is not formic but a strong acid such as hydrochloric acid. The remaining examples illustrate the comparative and superior properties obtained for organopolysiloxanes when the acid used is formic and at a considerably greater concentration.

In order to render the results comparable, the trialkoxysilane used in all examples was methyltrimethoxysilane. The procedure employed in preparing the organopolysiloxanes was likewise the same, except for acid concentration, temperature and time of precure, mole ratio of water to silane, and the like, all of which are noted in the following tables.

For each example, a reaction mixture was prepared comprising 136 grams of methyltrimethoxysilane (having a boiling point of 102° C.–103° C., and a specific gravity of 0.951), pure water in an amount to form the desired water to silane mole ratio, and either hydrochloric acid for Examples 1 and 2 or formic acid for the remaining examples. The reaction mixture was heated in a reaction flask with stirring until it cleared. The mixture was held at reflux conditions for four hours, while 50% of the alcohol resulting from hydrolysis was removed by distillation.

Thereafter, the reaction mixture was subjected to precure at a temperature and for a time indicated by the tables. This was followed by a cure at 135° C. to a fully cured state. Adhesion, acetone resistance, pencil hardness, and shelf life tests were carried out on each sample.

The adhesion and acetone resistance tests were conducted on a coating of the organopolysiloxane under test having a thickness of about 0.5 mil on a suitable substrate. For the adhesion test, the coating was cross-hatched with a sharp stylus and a strip of pressure-sensitive Scotch Tape, No. 670, was applied to the cross-hatched area, pressed firmly in place, and then stripped away. This is performed three times. If the coating remained in place with no tears or flaking apparent, it was accorded an excellent rating.

In the acetone resistance test, a section of cloth, one square inch in area, was saturated with acetone and placed against the coating. The cloth was maintained in an acetone-saturated condition. The time was measured until the coating exhibited any change due to the presence of the acetone, such as crazing.

The pencil hardness test is a standard test in which a line is drawn on the test organopolysiloxane specimen by pencils of predetermined and varying hardness. If a given pencil leaves lead on the specimen, the specimen is softer than the pencil. A pencil of the next hardness is then used. This practice is continued until a pencil of increased hardness does not leave lead but leaves instead an indentation. The specimen is then given the hardness rating of that pencil. With pencil values having an "H" suffix, the higher the number, the harder is the test specimen.

The viscosity stated in the tables is in centipoises at the temperatures indicated. Shelf life is the number of days the specimen withstood the temperatures indicated before gellation occured.

EXAMPLES 1 AND 2

These examples are not in accordance with the present invention. In these test runs, the acid used was hydrochloric and in a relatively small concentration, namely, 50 ppm.

TABLE A

| Example | 1 | 2 |
|---|---|---|
| $H_2O$:Silane Molar Ratio | 2.5:1 | 2.5:1 |
| HCl Acid | 50 ppm | 50 ppm |
| Appearance | Hazy | Hazy |
| Viscosity | 56.5° @ 25° C. | 79.2° @ 24° C. |
| Solids, weight percent | 50% | 50% |
| 135° C. Cure | | |
| Adhesion 1 hr. | Poor | Good |
| 2 hrs. | Poor | Poor |
| Acetone Resistance 1 hr. | 1 min. | 1 min. |
| 2 hrs. | 1 min. | 1 min. |
| Pencil Hardness 1 hr. | 5 H | 5 H |
| 2 hrs. | 5 H | 6 H |
| Precure | | |
| Temperature | 79° C. | 78° C. |
| Time | 9 min. | 7 min. |
| Shelf Life | | |
| Room Temperature | 4 days | 4 days |
| 100° F. | 3 days | 3 days |
| 45° F. | 10 days | 7 days |

As indicated, the adhesion of the organopolysiloxanes of these examples was poor, and the resins also had very poor acetone resistance of no more than one minute. The hardness value of the resins was likewise relatively poor at 5 H to 6 H. Shelf life was 10 days maximum.

EXAMPLES 3 THROUGH 6

In these examples, organopolysiloxanes were prepared, as described, from methyltrimethoxysilane in which formic acid was present in an amount of 1200 ppm. The adhesion of the specimens was excellent. The acetone resistance had increased over the specimens of Examples 1 and 2 to seven to more than 15 minutes. The hardness had likewise increased to 6 H to 7 H. The shelf life ranged from 8 to 27 days.

Examples 3 and 4 were of methyltrimethoxysilane as received from different suppliers, while examples 5 and 6 were the same materials as used in examples 3 and 4, respectively, after purification by distillation. Accordingly, differences in resulting values are believed to be due to various impurities present in the specimens as received and later removed. Table B summarizes the results.

EXAMPLES 7 THROUGH 10

In these examples, organopolysiloxanes were prepared, as described, from methyltrimethoxysilane in which formic acid was present in an amount of 2400 ppm. The adhesion was excellent. The acetone resistance was also improved as compared with Examples 1 and 2. The hardness of the resins was either 7 H or 8 H. The shelf life was also substantially improved as compared with the results of Examples 1 and 2. The various charges of trialkoxysilane were obtained from different suppliers. Moreover, Examples 7 and 8 were of such silanes as received, while Examples 9 and 10 corresponded to the silanes of Examples 7 and 8, respectively, but as purified by distillation. The differences in values noted are believed to be due to various impurities present in the specimens as received and possibly later removed. Table C summarizes the results.

EXAMPLES 11 THROUGH 14

In these examples, organopolysiloxanes were prepared, as described, from methyltrimethoxysilane in which formic acid was present in an amount of 4800 ppm. The adhesion was again excellent.

TABLE B

| Example | 3 | 4 | 5 | 6 |
|---|---|---|---|---|
| H$_2$O:Silane Molar Ratio | 2.5:1 | 2.5:1 | 2.5:1 | 2.5:1 |
| Formic Acid | 1200 ppm | 1200 ppm | 1200 ppm | 1200 ppm |
| Appearance | Clear | Slightly Hazy | Clear | Hazy |
| Viscosity | 16 @ 22° C. | 15.7 @ 22° C. | 12.5 @ 24° C. | 15.5 @ 23.5° C. |
| Solids, weight percent | 51% | 50% | 52% | 52% |
| 135° C. Cure | | | | |
| Adhesion 1 hr. | Excellent | Excellent | Excellent | Excellent |
| 2 hrs. | Excellent | Excellent | Excellent | Excellent |
| Acetone Resistance 1 hr. | 13 min. | 3 min. | >15 min. | 6 min. |
| 2 hrs. | 10 min. | 7 min. | >15 min. | 10 min. |
| Pencil Hardness 1 hr. | 7+ H | 6-7 H | 7+ H | 7 H |
| 2 hrs. | 7 H | 7 H | 7 H | 7 H |
| Precure Temperature | 110° C. | 96° C. | 160° C. | 102° C. |
| Time | 15 min. | 8.5 min. | 14 min. | 9 min. |
| Shelf Life | | | | |
| Room Temperature | — | 18 days | — | 27 days |
| 100° F. | 16 days | 9 days | — | 8 days |

TABLE C

| Example | 7 | 8 | 9 | 10 |
|---|---|---|---|---|
| H$_2$O:Silane Molar Ratio | 2.5:1 | 2.5:1 | 2.5:1 | 2.5:1 |
| Formic Acid | 2400 ppm | 2400 ppm | 2400 ppm | 2400 ppm |
| Appearance | Clear | Hazy | Clear | Hazy |
| Viscosity | 15.5 @ 24° C. | 15.7 @ 23.5° C. | 13.9 @ 24° C. | 15.7 @ 24° C. |
| Solids, weight percent | 51% | 51% | 51% | 50% |
| 135° Cure | | | | |
| Adhesion 1 hr. | Excellent | Excellent | Excellent | Excellent |
| 2 hrs. | Excellent | Excellent | Excellent | Excellent |
| Acetone Resistance 1 hr. | 9 min. | 2 min. | 9 min. | 6 min. |
| 2 hrs. | 8 min. | 3 min. | 6 min. | 6 min. |
| Pencil Hardness 1 hr. | 7 H | 7 H | 7 H | 7 H |
| 2 hrs. | 7 H | 8 H | 8 H | 8 H |
| Precure Temperature | 172° C. | 94° C. | 168° C. | 102° C. |
| Time | 16.5 min. | 8 min. | 13.5 min. | 9 min. |
| Shelf Life | | | | |
| Room Temperature | — | 26 days | — | 25 days |
| 100° F. | 19 days | 5 days | 24 days | 5 days |

TABLE D

| Example | 11 | 12 | 13 | 14 |
|---|---|---|---|---|
| H$_2$O:Silane Molar Ratio | 2.5:1 | 2.5:1 | 2.5:1 | 2.5:1 |
| Formic Acid | 4800 ppm | 4800 ppm | 4800 ppm | 4800 ppm |
| Appearance | Slightly Hazy | Hazy | Clear | Slightly Hazy |
| Viscosity | 18.4 @ 24° C. | 19.6 @ 23° C. | 12 @ 26° C. | 12.7 @ 24° C. |
| Solids | 52% | 51% | 51% | 51% |
| 135° C. Cure | | | | |
| Adhesion 1 hr. | Excellent | Excellent | Excellent | Excellent |
| 2 hrs. | Excellent | Excellent | Excellent | Excellent |
| Acetone Resistance 1 hr. | 10 min. | 3 min. | >15 min. | 10 min. |
| 2 hrs. | 10 min. | 3 min. | >15 min. | 10 min. |
| Pencil Hardness 1 hr. | 7 H | 7 H | 8 H | 8 H |
| 2 hrs. | 8 H | 8 H | 8 H | 8 H |
| Precure Temperature | 170° C. | 95° C. | 170° C. | 106° C. |
| Time | 13 min. | 10 min. | 13 min. | 9.5 min. |
| Shelf Life | | | | |
| Room Temperature | — | 24 days | — | 22 days |
| 100° F. | 19 days | 6 days | 23 days | 9 days |

TABLE E

| Example | 15 | 16 | 17 | 18 | 19 | 20 |
|---|---|---|---|---|---|---|
| H$_2$O:Silane Molar Ratio | 2.5:1 | 2.5:1 | 2.5:1 | 2.5:1 | 2.5:1 | 2.5:1 |
| Formic Acid, ppm. | 2,400 | 4,800 | 10,000 | 20,000 | 40,000 | 80,000 |
| Appearance | Clear | Clear | Hazy | Hazy | Hazy | Hazy |
| Viscosity | 23.4@24° C. | 22.3@23° C. | 22.2@23° C. | 22.4@23° C. | 21.0@23° C. | 24.5@23° C. |
| Solids, weight percent | 52% | 52% | 51% | 50% | 49% | 48% |
| 135° C. Cure | | | | | | |
| Adhesion 1 hr. | Excellent | Excellent | Excellent | Excellent | Excellent | Excellent |
| 2 hrs. | Excellent | Excellent | Excellent | Excellent | Excellent | Excellent |
| Acetone Resistance 1 hr. | 14 min. | 7 min. | 7 min. | 14 min. | 15 min. | 15 min. |
| 2 hrs. | 15 min. | 14 min. | 13 min. | 14 min. | 15 min. | 15 min. |

TABLE E-continued

| Example | 15 | 16 | 17 | 18 | 19 | 20 |
|---|---|---|---|---|---|---|
| Pencil Hardness 1 hr. | 7–8 H | 7–8 H | 7–8 H | 7–8 H | 7 H | 7–8 H |
| 2hr. | 7–8 H | 7–8 H | 7–8 H | 7–8 H | 7–8 H | 7–8 H |
| Precure Temperature | 146° C. | 138° C. | 156° C. | 103° C. | 100° C. | 95° C. |
| time | 15 min. | 14 min. | 15.5 min. | 10 min. | 10 min. | 9 min. |
| Shelf Line Room Temp. | 44 Days | 44 Days | 44 Days | 33 Days | 32 Days | 18 Days |
| 100° F. | 13 Days | 15 Days | 13 Days | 13 Days | 13 Days | 6 Days |

The acetone resistance range from 3 minutes to more than 15 minutes. The hardness of the organopolysiloxane coatings was again improved with respect to Examples 1 and 2 to the values of 7 H to 8 H, while shelf life ranged from 6 to 24 days. In these examples also, Examples 11 and 12 were run on specimens of methyltrimethoxysilane as received, while Examples 13 and 14 corresponded to Examples 11 and 12, respectively, in which the specimens had been purified by distillation. Differences in the resulting values are believed to be due to impurities presence or lack of the same. Table D summarizes the results and shows the superiority of these organopolysiloxanes as compared to those of Examples 1 and 2.

EXAMPLES 15 THROUGH 20

In these examples, organopolysiloxanes were prepared, as described, from methyltrimethoxysilane in which formic acid was used in amounts ranging from 2400 to 80,000 ppm. In all cases, the adhesion was excellent, the acetone resistance ranged from 7 to 15 minutes, and the pencil hardness was again at an excellent rating of 7 H to 8 H. For Examples 15 through 17, the shelf life at room temperature was an extensive 44 days. While organopolysiloxanes prepared from reaction mixtures having more than the formic acid amount of 10,000 ppm of Example 17 still possessed excellent physical properties as indicated, the shelf life began to decrease thereafter with increasing formic acid concentration. Table E summarizes the results.

Although the foregoing describes several embodiments of the present invention, it is understood that the invention may be practiced in still other forms within the scope of the following claims.

I claim:

1. In a process for preparing an organopolysiloxane by hydrolyzing a trialkoxysilane in aqueous solution containing at least the stoichiometric amount of water required for said hydrolysis up to a water to silane molar ration of about 10 and having an acid pH, and then heating the solution at an elevated temperature to condense the hydrolyzed silane to an organopolysiloxane, the improvements comprising using formic acid in said solution to form said acid pH and at a strength within the range of about 4800 ppm to about 300,000 ppm.

2. The process of claim 1 in which any alkoxy substituent of said trialkoxysilane contains from one to about six carbon atoms.

3. The process of claim 1 in which said trialkoxysilane is selected from the group consisting of alkyltrialkoxysilane in which said alkyl group contains from one to about six carbon atoms and phenyltrialkoxysilane.

4. The process of claim 1 in which said trialkoxysilane corresponds to the formula:

$$RSi(OR_1)_3$$

in which R is alkyl from one to about six carbon atoms and phenyl, and $R_1$ is alkyl from one to about six carbon atoms.

5. The process of claim 1 in which the molar ratio of said water to trialkoxysilane is within the range of about 1.5:1 to about 10:1, respectively.

6. The process of claim 1 in which said heating of the solution is at a temperature within the range of about 40° C. to about 300° C. for about one hour to about 10 hours.

7. The process of claim 1 including coating a substrate prior to heating said solution, and then heating to form a coating of said organopolysiloxane on said substrate.

8. The process of claim 1 including coating a resinous plastic body prior to heating said solution, and then heating to form a coating of said organopolysiloxane on said plastic body.

9. The process of claim 8 in which said resinous plastic body is polycarbonate.

10. A process for preparing at relatively high acid concentration without premature gelation an organopolysiloxane having increased hardness, comprising:
(a) hydrolyzing in aqueous solution a trialkoxysilane corresponding to the formula:

$$RSi(OR_1)_3$$

in which R is alkyl from one to about six carbon atoms and phenyl, and $R_1$ is alkyl from one carbon atom to about six carbon atoms,
(b) said aqueous solution having a molar ration of water to trialkoxysilane within the range of about 1.5:1 to about 5:1, respectively,
(c) said aqueous solution containing formic acid in an amount of about 4800 ppm to about 300,000 ppm, and
(d) heating said solution at a temperature within the range of 40° C. to about 300° C. for about one hour to about 10 hours to condense the hydrolyzed silane and form said organopolysiloxane.

11. The process of claim 10 including coating a substrate with said solution prior to heating, and then heating to form a coating of said organopolysiloxane on said substrate.

12. The process of claim 10 in which said heating forms a thermoset organopolysiloxane.

* * * * *